(12) United States Patent
Tseng et al.

(10) Patent No.: US 9,442,132 B2
(45) Date of Patent: Sep. 13, 2016

(54) ATOMIC FORCE MICROSCOPE DRYING SYSTEM AND ATOMIC FORCE MICROSCOPE

(71) Applicant: National Tsing Hua University, Hsinchu (TW)

(72) Inventors: Fan-Gang Tseng, New Taipei (TW); Joe-Ming Chang, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 14/626,612

(22) Filed: Feb. 19, 2015

(65) Prior Publication Data
US 2016/0003867 A1 Jan. 7, 2016

(30) Foreign Application Priority Data

Jul. 4, 2014 (TW) .............................. 103123192 A

(51) Int. Cl.
*G01Q 60/24* (2010.01)
*G01Q 30/12* (2010.01)
*B82Y 35/00* (2011.01)

(52) U.S. Cl.
CPC ............... *G01Q 30/12* (2013.01); *B82Y 35/00* (2013.01)

(58) Field of Classification Search
USPC ........ 850/33, 34, 35, 36, 37, 38, 39, 40, 41, 850/42
See application file for complete search history.

(56) References Cited

U.S. PATENT DOCUMENTS

2002/0162960 A1* 11/2002 Knauss ................. B82Y 35/00
250/306

* cited by examiner

*Primary Examiner* — Nicole Ippolito
(74) *Attorney, Agent, or Firm* — Muncy, Geissler, Olds & Lowe, P.C.

(57) ABSTRACT

A drying system, which can be implemented in an atomic force microscopy (AFM) machine according to the invention, includes an elastomer having elasticity and disposed between an AFM scan head device and a platen to form a chamber. A sample supporting substrate is disposed in the chamber and for placement of a specimen. A gas inlet pipeline extends from an outside of the chamber to an inside of the chamber to introduce a drying gas into the chamber. A gas outlet pipeline extends from the inside of the chamber to the outside of the chamber to exhaust the drying gas out of the chamber. Using the mechanism of introducing and exhausting the drying gas can exhaust the moisture out of the chamber, so that the relative humidity (RH) is decreased below 5% and a constant internal pressure is held in the space to become stable.

9 Claims, 4 Drawing Sheets

ATOMIC FORCE MICROSCOPE DRYING SYSTEM AND ATOMIC FORCE MICROSCOPE

This application claims priority of No. 103123192 filed in Taiwan R.O.C. on Jul. 4, 2014 under 35 USC 119, the entire content of which is hereby incorporated by reference.

BACKGROUND OF THE INVENTION

1. Field of the Invention

The invention relates to an atomic force microscope (AFM) drying system and an AFM, and more particularly to an AFM drying system that can be externally installed into an AFM, and an AFM including the AFM drying system.

2. Related Art

In the modern scanning probe microscope (SPM), the acting force between the probe and the specimen is the sum of many acting forces, one of which is a water-film siphon force that is frequently seen in the wetter country, such as Taiwan. The attracting force, caused by the water film having about the nanometer level (about 5 nm) and attached to the probe or specimen due to wet, has the significant influence and disturbance on the attraction measurement of the scan head. On the other hand, when the probe scans the fragile specimen, the water-film siphon force attracts the probe to heavily squeeze the specimen to damage the specimen, and the clear image cannot be generated.

The water-film siphon force is a problem encountered when many operators operate the scan probe microscopes. Generally speaking, upon measurement of the electrostatic charge force or the magnetic force and in order to eliminate the disturbance of the water film acting force, the AFM is placed in a nitrogen cabinet or a moistureproof cabinet to keep the experimental environment at a constant humidity or a highly dried environment. The measurement of the acting force between the biometrics molecules, the measurement of the Van der Waals force or the scanning of the fragile specimen is performed by directly immersing the probe and the specimen into the liquid environment to eliminate the influence caused by the water film acting force.

FIG. 1 is a schematic view showing a conventional AFM. As shown in the example of FIG. 1, the AFM is placed in a nitrogen cabinet or a moistureproof cabinet. A conventional AFM 300 comprises an AFM scan head device 310, a platen 320 and a sample supporting substrate 340. The AFM scan head device 300 comprises a scan head 311. The scan head 311 is to be in contact with an object K on the specimen 210. In addition, the conventional AFM 300 is placed in a nitrogen cabinet or moistureproof cabinet 350. The nitrogen cabinet 350 is introduced with nitrogen to hold the dryness in the nitrogen cabinet 350, while the dryness of the moistureproof cabinet 350 is held by way of moisture control.

However, the two frequently seen methods have their own drawbacks. Regarding one drawback, a nitrogen cabinet or moistureproof cabinet 350 applicable to the scan probe microscope system also has to overcome the inconvenience of the user in operating the instrument and to facilitate the line construction. Thus, a nitrogen cabinet or moistureproof cabinet for the combined SPM dedicated environment control has the price of several hundreds of thousands, has the huge size and cannot be easily operated. On the other hand, if the probe operates in the liquid environment, the problem of liquid contamination or the problem that the sample liquid cannot be easily replaced is encountered.

Thus, the invention provides a more novel, convenient and cheap mechanism design form removing the water film acting force.

SUMMARY OF THE INVENTION

According to the invention, an atomic force microscope (AFM) drying system and an AFM are provided. In one embodiment, an AFM drying system and an AFM, which achieve the drying function by introducing a drying gas, are provided. In another embodiment, an AFM drying system and an AFM, which use an elastomer to form a slightly air-tight space and are introduced with a drying gas to achieve the drying function, are provided.

An AFM according to an embodiment of the invention comprises an AFM scan head device, a platen, an elastomer, a sample supporting substrate, a gas inlet pipeline and a gas outlet pipeline. The AFM scan head device scans a specimen. The elastomer has elasticity and is disposed between the AFM scan head device and the platen to form a chamber. The sample supporting substrate is disposed in the chamber and for supporting the specimen placed on the sample supporting substrate. The gas inlet pipeline extends from an outside of the chamber to an inside of the chamber and has an inlet port communicating with the chamber to introduce a drying gas into the chamber. The gas outlet pipeline extends from the inside of the chamber to the outside of the chamber and has a gas outlet communicating with the chamber to exhaust the drying gas out of the chamber.

In one embodiment, a gas input amount introduced into the chamber is substantially equal to a gas output amount exhausted from the chamber, so that the chamber is held in a constant-pressure state.

In one embodiment, a pressure inside the chamber is higher than a pressure outside the chamber, so that moisture from outside cannot easily enter the chamber.

In one embodiment, a position of the inlet port of the gas inlet pipeline and a position of the gas outlet of the gas outlet pipeline are opposite to each other and in the chamber. Preferably, an aperture of the inlet port and an aperture of the gas outlet are substantially equal to each other so that a gas stream in the chamber becomes stabler.

In one embodiment, a height of a surface of the sample supporting substrate is higher than positions of the inlet port and the gas outlet, so that the specimen is not affected by the excessive air stream, and the scan head is less likely interfered by the gas stream to affect the measurement result.

In one embodiment, the sample supporting substrate defines a placement region for placement of the specimen, and positions of the inlet port and the gas outlet are not located under the placement region. Thus, the scan head is less likely interfered by the gas stream to affect the measurement result.

In one embodiment, the AFM scan head device and the platen exert pressing forces onto the elastomer so that top and bottom surfaces of the elastomer rest against and in contact with the AFM scan head device and the platen, respectively. Thus, the chamber slightly has the air-tight function. That is, the chamber is a space, in which the gas cannot easily flow, and the space is not a fully air-tight space.

An AFM drying system according to an embodiment of the invention is to be installed on an AFM adapted to scanning of a specimen. The AFM drying system comprises an elastomer, a sample supporting substrate, a gas inlet pipeline and a gas outlet pipeline. The elastomer has elasticity and is disposed between an AFM scan head device of the AFM and a platen of the AFM to form a chamber. The sample supporting substrate is disposed in the chamber and for supporting the specimen placed on the sample supporting substrate. The gas inlet pipeline extends from an outside of the chamber to an inside of the chamber and has an inlet port communicating with the chamber to introduce a drying gas into the chamber. The gas outlet pipeline extends from the inside of the chamber to the outside of the chamber and has a gas outlet communicating with the chamber to exhaust the drying gas out of the chamber.

According to an embodiment of the invention, a convenient and cheap AFM drying system and AFM, each of which has the drying function, has the mechanism design of removing the water film acting force, and can be easily and simply manufactured, can be obtained.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
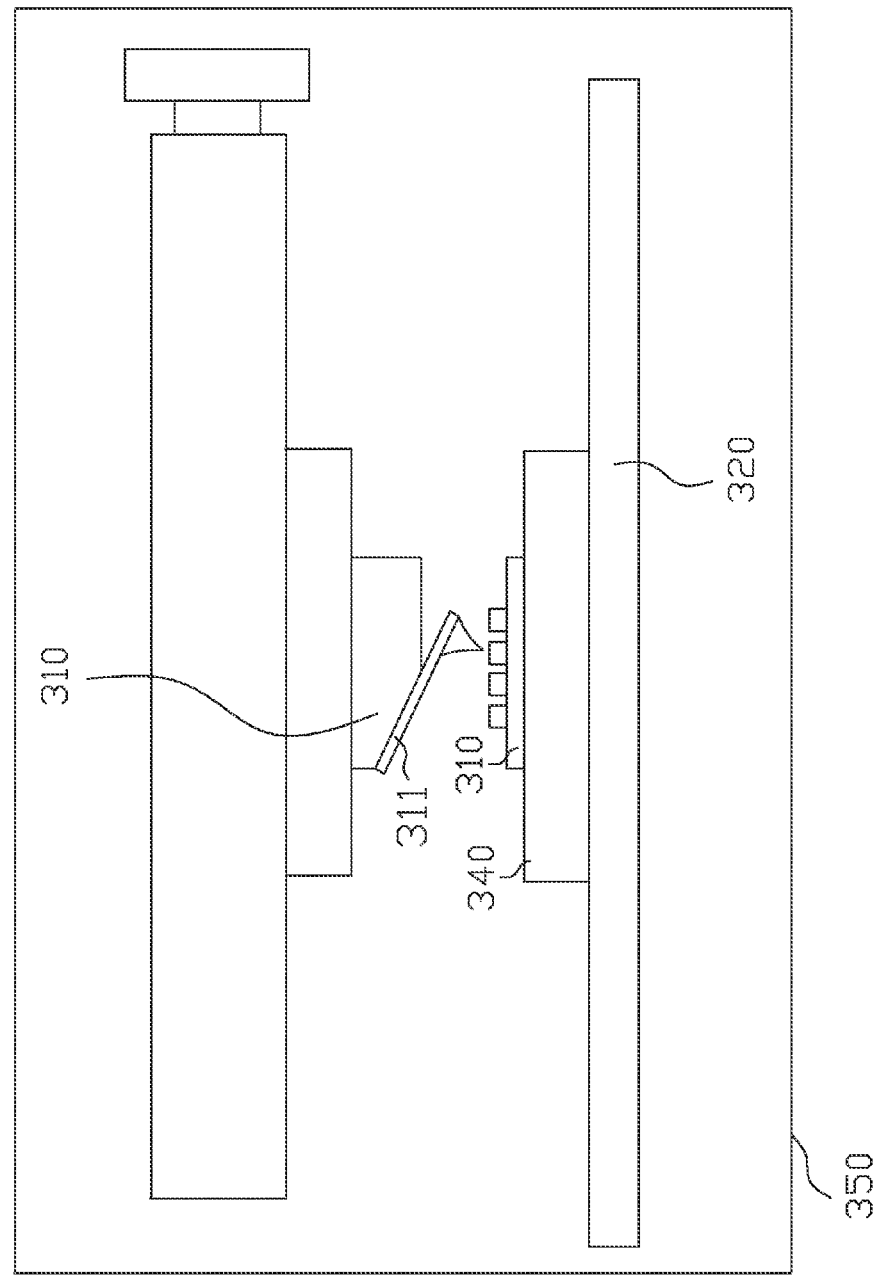
FIG. 1 is a schematic view showing a conventional AFM.
Figure 2:
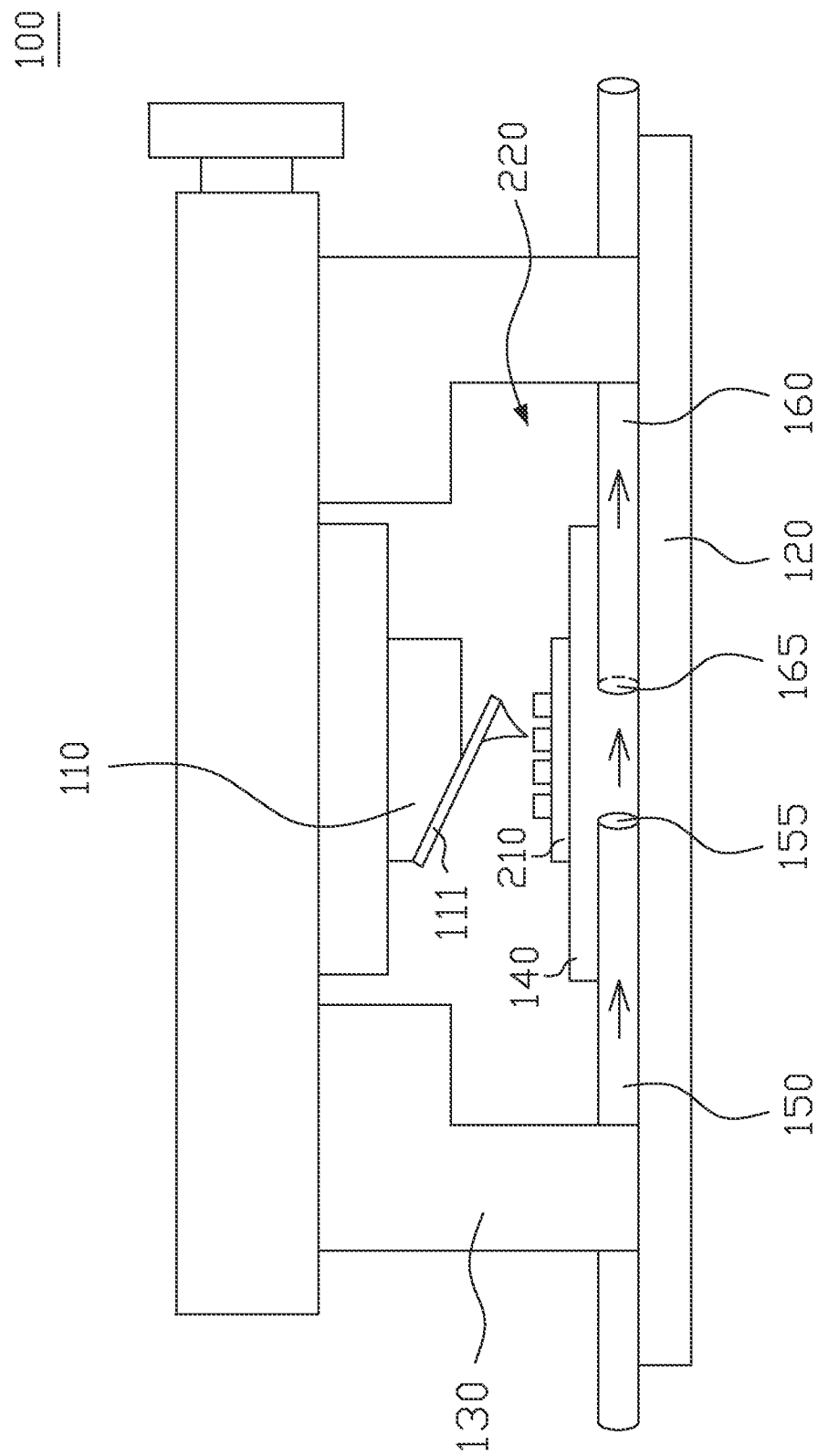
FIG. 2 is a schematic view showing an AFM with a drying function according to an embodiment of the invention.

FIG. 2 is a schematic view showing an AFM with a drying function according to an embodiment of the invention. Referring to FIG. 2, an AFM 100 having a drying function according to an embodiment of the invention comprises an AFM scan head device 110, a platen 120, an elastomer 130, a sample supporting substrate 140, a gas inlet pipeline 150 and a gas outlet pipeline 160. The AFM scan head device 110 scans a specimen 210. More specifically, the AFM scan head device 110 comprises a scan head 111. The scan head 111 is to be in contact with an object K on the specimen 210. In one embodiment, the AFM 100 having a drying function is mainly used to measure an electric field which is not affected by a water film. When a water film is attached onto the object K, the electric field cannot be correctly measured since water is a conductor. Accordingly, the object K is preferably a non-biological vivo molecule. However, the object K should not be restricted to the non-biological vivo molecule, and may also be a biological vivo molecule, such as myosin, membrane protein, or the like. For example, the dried biological vivo molecule sample that is dried by the AFM 100 having a drying function can avoid the influence of the siphon force of the water film, so that the AFM 100 can scan and obtain very subtle and micro-scale structures of the biological vivo molecule sample. In addition, the biological vivo molecule sample may also be damaged by the scan head of the AFM 100 due to the influence of the siphon force of the water film. Since the AFM 100 of the present invention can remove the water film and avoid the influence of the siphon force of the water film, the AFM 100 can be used to avoid the above problem.

The elastomer 130 has the elasticity and is disposed between the AFM scan head device 110 and the platen 120 to form a chamber 220, wherein the details thereof will be described in the following.

The sample supporting substrate 140 for supporting a specimen 210 placed on the sample supporting substrate 140 is disposed in the chamber 220. The gas inlet pipeline 150 extends from the outside of the chamber 220 to the inside of the chamber 220, and has an inlet port 155 communicating with the chamber 220, so that a drying gas is introduced into the chamber 220 through the inlet port 155. In one embodiment, the other end of the gas inlet pipeline 150 is connected to an inflator (not shown) filled with the drying gas. The drying gas in the inflator can be introduced into the chamber 220 through the gas inlet pipeline 150 and the inlet port 155. The gas outlet pipeline 160 extends from the inside of the chamber 220 to the outside of the chamber 220, and has a gas outlet 165 communicating with the chamber 220, and the drying gas is exhausted to the outside of the chamber 220 through the gas outlet 165.

In one embodiment, the gas input amount introduced into the chamber 220 is substantially equal to the gas output amount exhausted from the chamber 220, so that the chamber 220 is held in a constant-pressure state. Preferably, the pressure in the chamber 220 is higher than that outside the chamber, so that the moisture cannot easily enter the chamber 220 from the outside.

In addition, because a gas stream flows in the chamber 220, the gas stream may interfere with the scan head 111 and exert an addition acting force onto the scan head 111. In order to overcome the above-mentioned problem, the position of the inlet port 155 of the gas inlet pipeline 150 and the position of the gas outlet 165 of the gas outlet pipeline 160 are opposite to each other and in the chamber 220 in one embodiment. In the condition where the inlet port 155 and the gas outlet 165 are opposite to each other, the impedance of the gas stream from the inlet port 155 to the gas outlet 165 is smaller, and the possibility of generating the turbulent flow in the chamber 220 is also lower. Thus, the interference of the gas stream on the scan head 111 is also smaller. Preferably, the aperture of the inlet port 155 and the aperture of the gas outlet 165 are substantially the same, so that the gas stream in the chamber 220 becomes more stable In one embodiment, the height of the surface of the sample supporting substrate 140 is higher than the positions of the inlet port 155 and the gas outlet 165. Because the gas stream flows below the specimen 210, the height difference can be effectively utilized to avoid the drying gas stream (e.g., nitrogen stream) to stabilize the cantilever beam of the scan head 111. Thus, the cantilever beam of the scan head 111 can be less likely interfered with the gas stream, so that the more precise measurement result is obtained.

Figure 3:
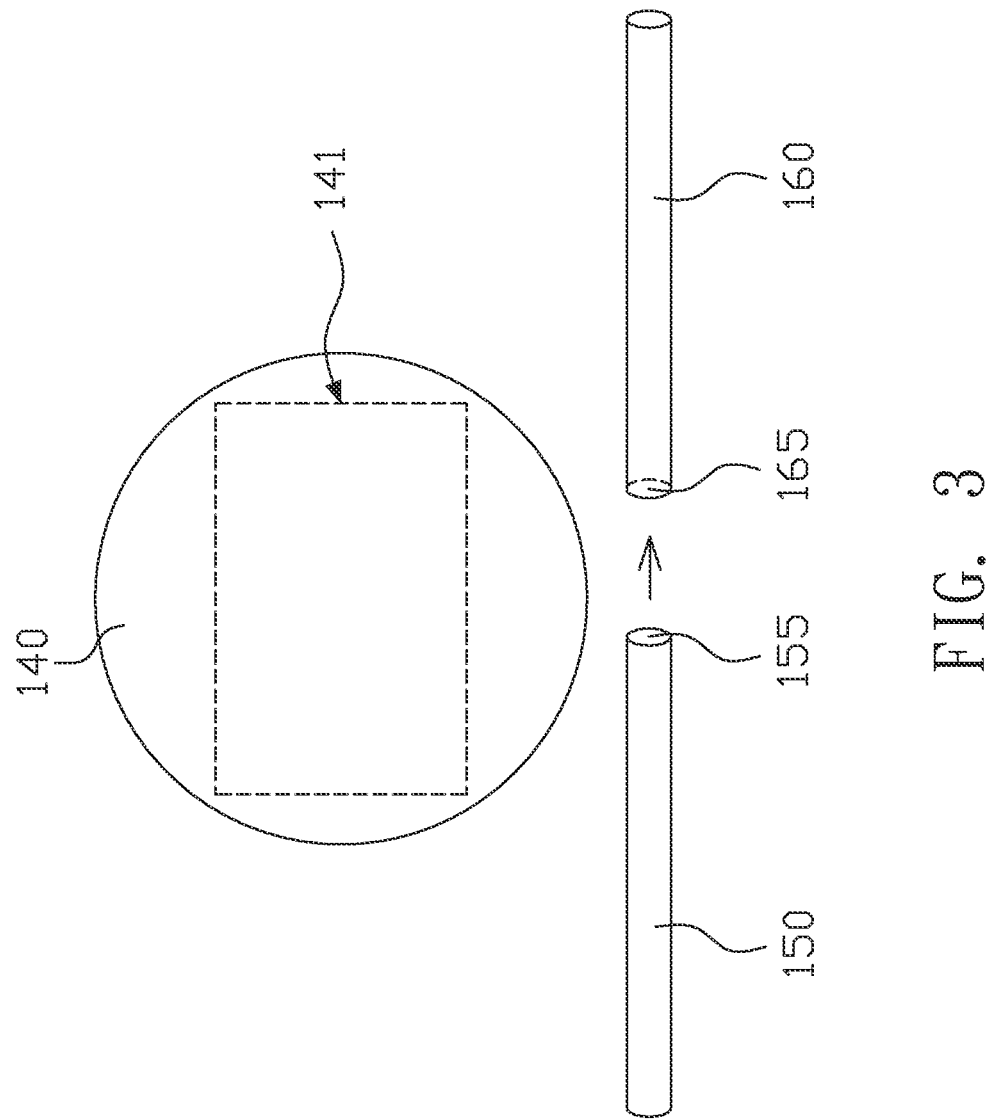
FIG. 3 is a top view showing a chamber in the embodiment of FIG. 2.

FIG. 3 is a top view showing a chamber in the embodiment of FIG. 2. As shown in FIG. 3, the sample supporting substrate 140 defines a placement region 141, in which the specimen 210 is placed. In addition, the positions of the inlet port 155 and the gas outlet 165 deviate from the position under the placement region 141. That is, none of the inlet port 155 and the gas outlet 165 is disposed under the placement region 141, so that the scan head 111 is not likely interfered with the gas stream, whereas the interference affects the measurement result.

Figure 4:
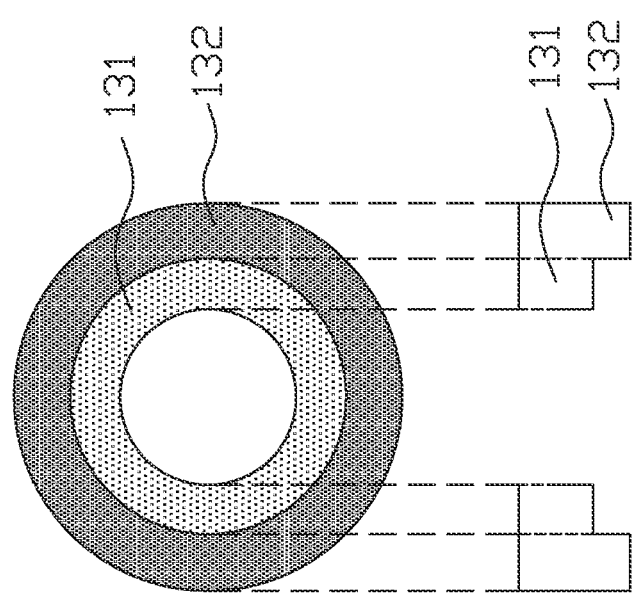
FIG. 4 is a top and cross-sectional view showing an elastomer according to an embodiment of the invention.

FIG. 4 is a top and cross-sectional view showing an elastomer according to an embodiment of the invention. The elastomer 130 is composed of two concentric rings 131 and 132, the diameter and volume of the concentric ring 131 are smaller than the diameter and volume of the concentric ring 132, and the height of the concentric ring 132 is higher than the height of the concentric ring 131. With such the design, the space defined by the elastomer 130, the AFM scan head device 110 and the platen 120 is divided into two portions. The first portion of the chamber 220 is formed by the concentric ring 131 and accommodates one scan head 111 of the AFM scan head device 110. In addition, the second portion of the chamber 220 is formed by the concentric ring 132 and accommodates the sample supporting substrate 140 and the specimen 210. With such the design, the generation of the interference gas stream is less because the space of the first portion is smaller, so that the scan head 111 is not likely interfered by the gas stream, and the measurement accuracy is thus enhanced.

In one embodiment, it is also possible to make the AFM scan head device 110 and the platen 120 press the elastomer 130, so that the top and bottom surfaces of the elastomer 130 rest against and are in close contact with the AFM scan head device 110 and the platen 120, respectively. Because the top and bottom surfaces of the elastomer 130 rest against and are in close contact with the AFM scan head device 110 and the platen 120, respectively, the air cannot easily flow out through the gaps between the top and bottom surfaces of the elastomer 130 and the AFM scan head device 110 and the platen 120. According to this design, the chamber 220 slightly has the air-tight function. That is, the gas cannot easily flow but the fully air-tight space is not established. Because the chamber 220 cannot reach the fully air-tight condition, a drying gas is introduced into the chamber 220 to take away the moisture from the chamber 220, and the chamber 220 is kept in the dry state.

In one embodiment, it is only necessary to place the gas inlet pipeline 150 and the gas outlet pipeline 160 on the platen 120, and then place the elastomer 130 on the gas inlet pipeline 150 and the gas outlet pipeline 160. Because the elastomer 130 has the elasticity, when the AFM scan head device 110 and the platen 120 exert pressing forces onto the elastomer 130, the gas inlet pipeline 150 and the gas outlet pipeline 160 also have close contacts on the elastomer 130, so that the chamber 220 forms a slightly air-tight space.

In one embodiment, it is also possible to form two openings on the elastomer 130, and insert the gas inlet pipeline 150 and the gas outlet pipeline 160 into these openings, respectively, wherein the outer circumferences of the gas inlet pipeline 150 and the gas outlet pipeline 160 are in close contact with wall surfaces of the elastomer 130 defining the openings, so that the chamber 220 is formed with a slightly air-tight space. In one embodiment, the elastomer 130 may be an O-ring.

In addition, the invention does not intend to restrict the type of the drying gas. In one embodiment, the drying gas may be an inert gas. More specifically, the drying gas may also be nitrogen.

Experiments will be made in the following to prove the drying function of the AFM according to the embodiment of the invention. A hygrometer is placed into the elastomer 130 with the chamber 220 being introduced with the nitrogen to remove the moisture, and then the values on the hygrometer at different time instants are recorded. Before the nitrogen is introduced, the humidity in the elastomer 130 is RH=52%; after the nitrogen is introduced, the humidity RH in the elastomer 130 is decreased to 17%; after a period of time, the humidity RH in the elastomer 130 is decreased to be lower than 10%; and finally, the humidity RH in the elastomer 130 is decreased to be lower than 5%. At this time, the measurement limit of the hygrometer is almost reached, and the detection cannot be further performed.

According to one embodiment of the invention, the chamber 220 is not formed with the fully air-tight space, so the convenient and cheap AFM, which has the drying function, has the mechanism design of removing the water film acting force, and can be easily and simply manufactured, can be obtained. In addition, in the drying device for drying the gas stream system according to one embodiment of the invention, the cheap, small-size and conciseness elastomer 130 of O-ring is properly used, so that the drying device constituted by the elastomer 130, the gas inlet pipeline 150, the gas outlet pipeline 160 and the nitrogen bottle can be rapidly established to have the light and handy advantages. In addition, the drying device has been proved to effectively control the relative humidity in the working range and to eliminate the influence of the water-film siphon force. Thus, the drying device is suitable for the commercial effectiveness SPM additional accessory.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. An atomic force microscopy (AFM) with a drying function, the AFM comprising:
   an AFM scan head device for scanning a specimen;
   a platen;
   an elastomer, which has elasticity and is disposed between the AFM scan head device and the platen to form a chamber;
   a sample supporting substrate, which is disposed in the chamber, and for supporting the specimen placed on the sample supporting substrate;
   a gas inlet pipeline, which extends from an outside of the chamber to an inside of the chamber and has an inlet port communicating with the chamber to introduce a drying gas into the chamber; and
   a gas outlet pipeline, which extends from the inside of the chamber to the outside of the chamber and has a gas outlet communicating with the chamber to exhaust the drying gas out of the chamber;
   wherein a height of a surface of the sample supporting substrate is higher than positions of the inlet port and the gas outlet.

2. The AFM according to claim 1, wherein a gas input amount introduced into the chamber is substantially equal to a gas output amount exhausted from the chamber.

3. The AFM according to claim 1, wherein a pressure inside the chamber is higher than a pressure outside the chamber, so that moisture from outside cannot easily enter the chamber.

4. The AFM according to claim 1, wherein a position of the inlet port of the gas inlet pipeline and a position of the gas outlet of the gas outlet pipeline are opposite to each other and in the chamber.

5. The AFM according to claim 1, wherein an aperture of the inlet port and an aperture of the gas outlet are substantially equal to each other.

6. The AFM according to claim 5, wherein,
the sample supporting substrate defines a placement region for placement of the specimen, and
positions of the inlet port and the gas outlet are not located under the placement region.

7. The AFM according to claim 1, wherein the AFM scan head device and the platen exert pressing forces onto the elastomer so that top and bottom surfaces of the elastomer rest against and in contact with the AFM scan head device and the platen, respectively; and the chamber has the airtight function.

8. The AFM according to claim 1, wherein the drying gas is an inert gas.

9. An atomic force microscopy (AFM) drying system to be installed on an AFM adapted to scanning of a specimen, the drying system comprising:

an elastomer, which has elasticity and is disposed between an AFM scan head device of the AFM and a platen of the AFM to form a chamber;

a sample supporting substrate, which is disposed in the chamber and for supporting the specimen placed on the sample supporting substrate;

a gas inlet pipeline, which extends from an outside of the chamber to an inside of the chamber and has an inlet port communicating with the chamber to introduce a drying gas into the chamber; and a gas outlet pipeline, which extends from the inside of the chamber to the outside of the chamber and has a gas outlet communicating with the chamber to exhaust the drying gas out of the chamber;

wherein, the drying gas reduces water-film siphon force from the specimen.

* * * * *